United States Patent
Biber

Patent Number: 6,072,622
Date of Patent: Jun. 6, 2000

[54] OPERATION MICROSCOPE

[75] Inventor: Klaus Biber, Aalen, Germany

[73] Assignee: Carl-Zeiss-Stiftung, Germany

[21] Appl. No.: 08/165,774

[22] Filed: Dec. 13, 1993

[30] Foreign Application Priority Data

Dec. 23, 1992 [DE] Germany ............................. 42 43 488

[51] Int. Cl.⁷ ................................................ G02B 21/00
[52] U.S. Cl. ...................... 359/368; 359/369; 359/370; 359/382; 359/383; 359/385; 359/380
[58] Field of Search ............................. 359/368, 369, 359/370, 372, 375, 376, 379, 380, 382, 389, 383, 381, 385

[56] References Cited

U.S. PATENT DOCUMENTS

| | | | |
|---|---|---|---|
| 3,249,001 | 5/1966 | Stauffer | 353/101 |
| 3,744,894 | 7/1973 | Hoadley | 353/101 |
| 3,798,665 | 3/1974 | Eloranta et al. | 359/375 |
| 4,312,559 | 1/1982 | Kojima et al. | 359/19 |
| 4,448,498 | 5/1984 | Muller et al. | 359/385 |
| 4,614,411 | 9/1986 | Horenz | 359/375 |
| 4,724,319 | 2/1988 | Shirota | 250/307 |
| 4,779,968 | 10/1988 | Sander | 359/389 |
| 4,991,947 | 2/1991 | Sander et al. | 359/375 |
| 5,018,846 | 5/1991 | Gutridge | 359/374 |
| 5,132,837 | 7/1992 | Kitajima | 359/368 |
| 5,140,458 | 8/1992 | Takagi et al. | 359/380 |
| 5,270,855 | 12/1993 | Hasegawa | 359/368 |
| 5,434,703 | 7/1995 | Morizumi | 359/385 |

FOREIGN PATENT DOCUMENTS

| | | | |
|---|---|---|---|
| 290064 | 5/1991 | Germany | 359/375 |
| 1911114 | 8/1988 | Japan | 359/385 |
| 264911 | 10/1990 | Japan | 359/380 |

*Primary Examiner*—Cassandra Spyrou
*Assistant Examiner*—Mohammad Y. Sikder

[57] ABSTRACT

For focusing an operation microscope within a defined focusing range, a main objective and parts of an illuminating device are arranged in a focusing module that is separate from the microscope body. The focusing module is movable along the optical axis in a defined manner by means of manual or motor drives, so that focusing on a desired object detail is possible. Desired fine focusing can thus take place, in addition to coarse focusing by spatial positioning of the operation microscope by means of a stand. The advantages are a compact design, prevention of reflections through the main objective, and widely varied possibilities for filling of additional accessories.

22 Claims, 3 Drawing Sheets

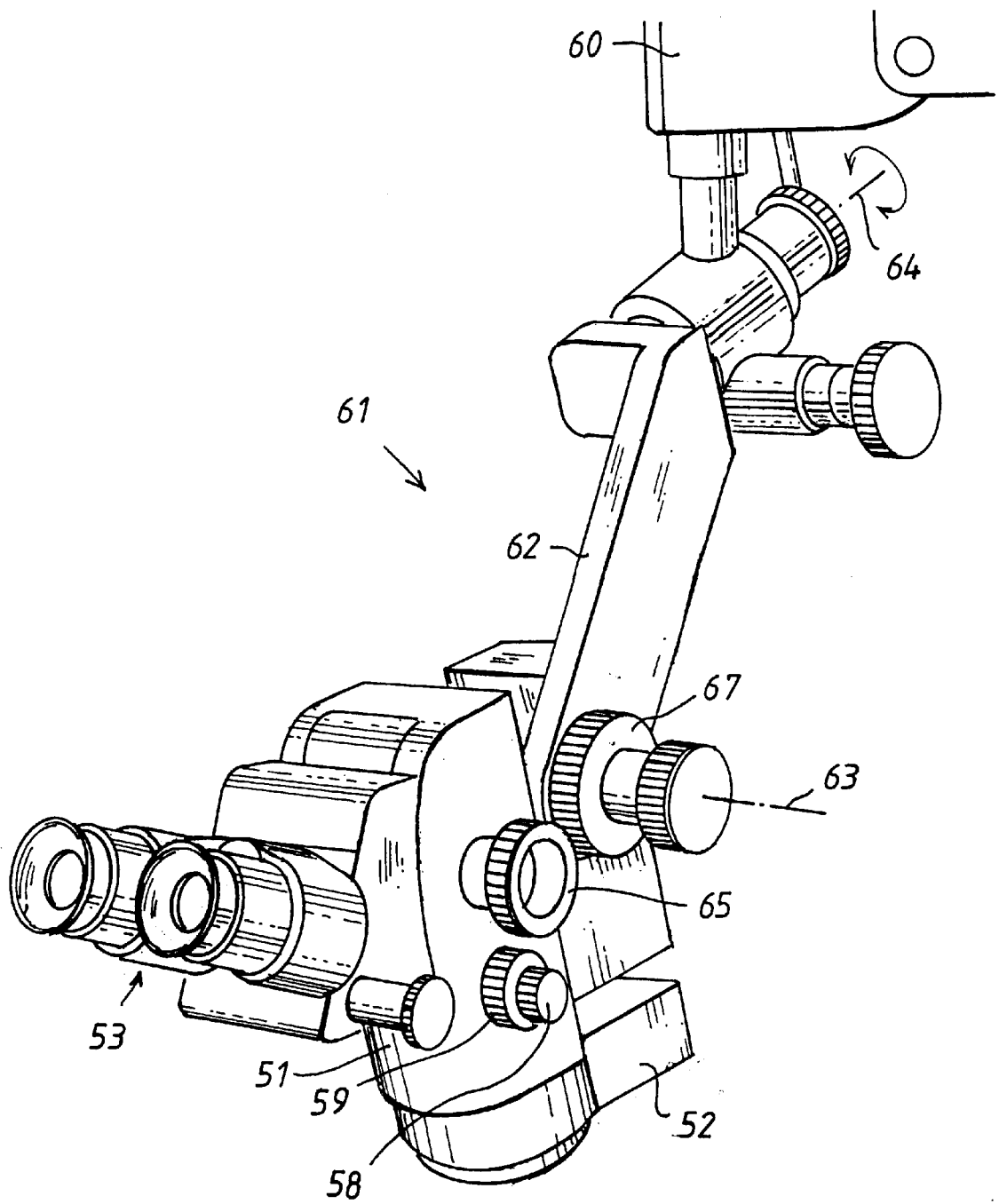

OPERATION MICROSCOPE

BACKGROUND OF THE INVENTION

1. Field the Invention

The present invention relates to an operation microscope having a microscope body, at least one main objective and an illuminating device that includes several optical elements.

2. Relevant Prior Art

Various focusing devices are known for focusing operation microscopes on object details of interest.

For example, focusing can take place by the relative displacement of the whole microscope body inclusive of the main objective along the optical axis. Such an arrangement is described, for example, in Product Information No. 30-259,2-e of Carl Zeiss Company of Germany, the assignee of the present invention. For a required focusing region of several centimeters, however, a device of this kind results in a relatively large constructional volume for the entire operation microscope and a correspondingly costly drive, including gears, for the microscope body proper. Because of the so-called focusing box, which is mounted to the side or behind the microscope body and which accommodates the focusing drive and gears, space is limited for additional accessories, such as secondary viewing devices and documentation devices.

An alternative, second focusing arrangement for operation microscopes takes place in the displacement of the complete main objective along the optical axis, axially of the respective magnification-changing device. Such a device is shown in Product Information 30-001/I-d (pp. 30-31) of the Carl Zeiss Company of Germany. Since the illuminating device that is required is fixed to the microscope body proper, the distance between the boundary surface of the main objective and the illuminating device is changed during focusing. Undesired reflections consequently result. A further disadvantage is that no additional accessories such as micromanipulators for lasers or the like can be attached to the operation microscope.

A third arrangement for focusing an operation microscope takes place by means of a main objective of variable focal intercept, comprised of several individual lens elements that are displacable relative to one another. Such devices are described, for example, in German Patent 2,439,820(U.S. Pat. No. 4,155,622) and in German Utility Model G 9,016, 892.5 of the Carl Zeiss Company of Germany. the arrangement of the main objective relative to the illuminating device is a problem here. In a fixed arrangement of the illuminating device in the microscope body, further reflections result from focusing through if the spacing between the main objective and the illuminating device changes. On the other hand, if the illuminating device is uncoupled from the main objective, in that the illuminating beam path is not deflected by the main objective in the direction of the object detail, the problem arises that the whole illumination field is always present, independently of the respective state of focusing. In order to dimension this illumination field optimally for all possible focusing states, a costly illumination device of high light density is required for each case. Coupling the illuminating device to the respective focusing state would also be costly.

SUMMARY OF THE INVENTION

The object of the present invention is to prevent, or at least to minimize, the disadvantages of the state of the art described hereinabove.

The object is achieved by an operation microscope in which a separate focusing module is provided that is movable in a defined manner relative to the microscope body. The separate focusing module includes the main objective and at least one of several optical elements of the illuminating device.

A series of decisive advantages over the state of the art as described hereinabove results from the operation microscope according to the invention. The large-volume focusing box required according to the first focusing arrangement described above is dispensed with; i.e., the operation microscope according to the invention has a very compact design. A great variety of accessories, such as secondary viewing or documentation devices, can be adapted by corresponding mechanical-optical interfaces to the microscope body proper, without being limited in this regard by a laterally arranged focusing box. The microscope suspension on a respective stand ideally can take place by means of a further mechanical interface on the microscope body. The arrangement of hand manipulation places on the microscope body also contributes by facilitating a smooth-running manual positioning about given spatial axes.

If motor focusing is desired for the operation microscope according to the invention, the required drive can be dimensioned in a considerably less costly manner. This is because the complete operation microscope, including accessories, no longer has to be moved. Only a separate focusing module is moved, which is of significantly lower weight and contains the main objective and also portions of the illuminating device. Manual focusing, for example by means of a rotary knob on the microscope body, is, of course, a possible alternative to motor focusing. Also, it is only the relatively lightweight focusing module that has to be moved.

In comparison with the second focusing arrangement described hereinabove, because of the constant distance between the illuminating device and the main objective, reflections that arise when this distance is varied on focusing through also disappear. Since the illuminating beam path always passes through the main objective, coupling the size of the illuminating field to the respective state of focusing is always ensured. In contrast to the third focusing arrangement described hereinabove, the light source used can be dimensioned in a substantially less costly manner.

Moreover, extremely varied accessory components, such as a micromanipulator for lasers or double objectives, can be filted beneath the microscope body to the movable focusing module via corresponding interfaces on the operation microscope without limitations due to space considerations.

It is particularly suitable to use the operation microscope according to the invention in conjunction with a stand that has torque equalization according to U.S. patent application Ser. No. 08/125,116, and U.S. Pat. No. 5,492,296 which was filed Sep. 21, 1993 assigned to the Carl Zeiss Company of Germany. Coarse focusing of the operation microscope takes place by the smooth-running spatial positioning of the whole operation microscope, while fine focusing takes place within the operation microscope proper, in the manner according to the invention, by means of the focusing module. Adjustability of the required torques is ensured by a respective elastic energy accumulator. If fine focusing of the operation microscope is carried out by means of a manual drive, it is advantageous to match the resistance to rotation when positioning the stand and the resistance to rotation of the manual focusing element, which is, for example, a rotary knob.

DESCRIPTION OF THE DRAWINGS

Further details and advantages of the operation microscope according to the invention will become apparent from the description hereinbelow of preferred embodiments taken together with the accompanying drawings, in which:

FIG. 3 shows a fourth preferred embodiment of the operation microscope according to the invention, arranged on a particularly suitable, displacable stand.

DETAILED DESCRIPTION OF PREFERRED EMBODIMENTS

Figure 1:
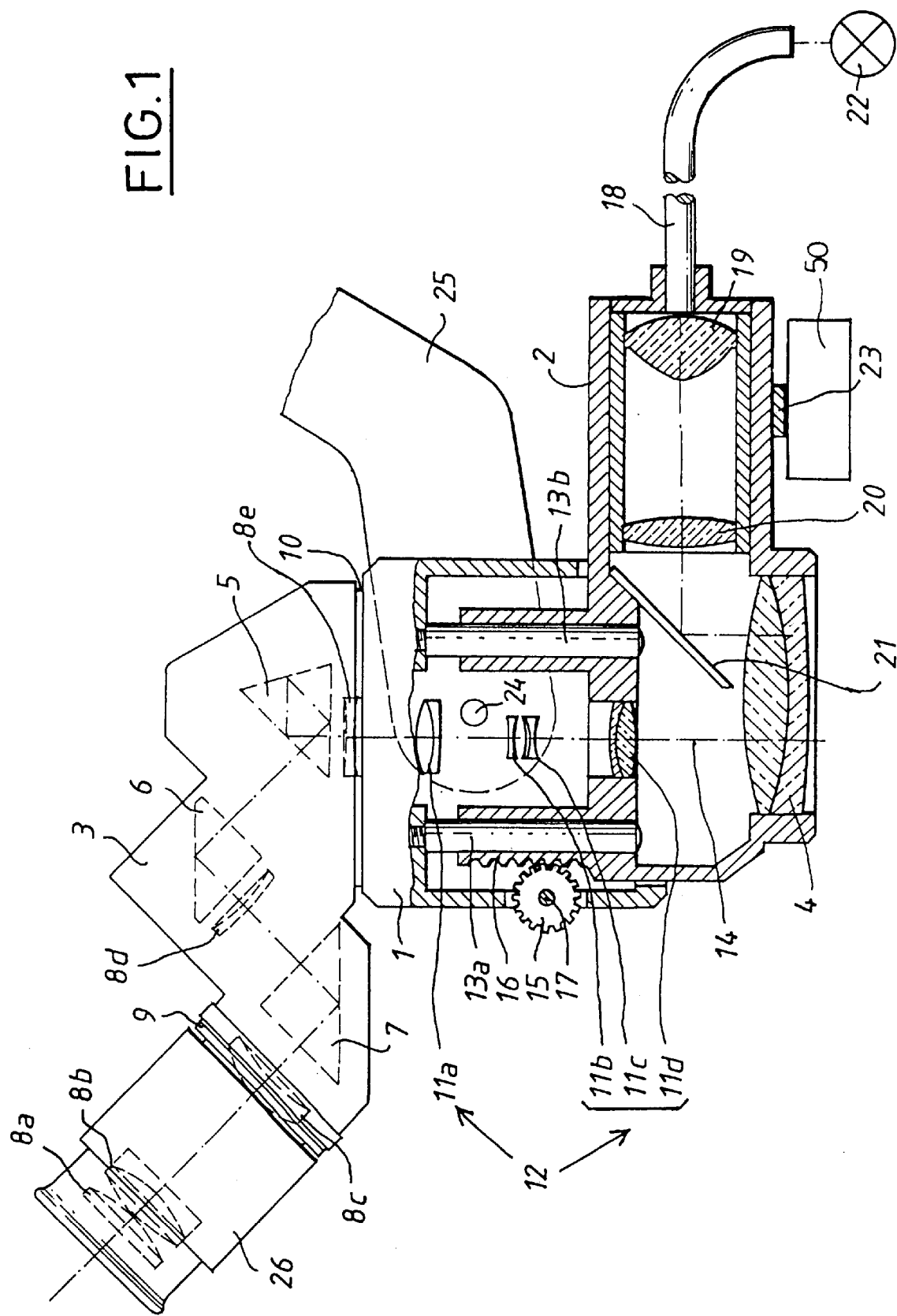
FIG. 1 shows a schematic side view of a first preferred embodiment of the operation microscope according to the invention.

In FIG. 1, the operation microscope according to the invention is shown schematically in a side view. It essentially consists of three modular main components: the microscope body proper (1), a separate focusing module (2) holding parts of the illuminating device and the main objective (4), and a binocular observation tube (3).

The binocular observation tube (3) is constructed in a manner known per se. It essentially includes several deflecting prisms (5, 6, 7), eyepiece lenses (8a, 8b) and tube lenses (8c, 8d, 8e) for each of the two stereoscopic observation beam paths. Eyepiece tubes (26) can be rotatably movable about a mechanical interface (9). The whole binocular observation tube (3) can, moreover, be arranged to pivot relative to the microscope body (1).

The microscope body (1) is arranged beneath the binocular observation tube (3) via an additional mechanical interface (10). A magnification-changing device (12) is located within the microscope body (1), and consists of several optical elements (11a, 11b, 11c, 11d). A pancratic magnification system can, for example, be used as the magnification-changing device. The user can set the desired state of magnification by means of a rotary knob, not shown in FIG. 1. A simpler design of the operation microscope according to the invention can of course be arranged such that no magnification-changing device is provided in the microscope body (1). Furthermore, the microscope body (1) has linear guides (13a, 13b) in which a separate focusing module (2) is smoothly movable along the optical axis (14). For defined motion of the focusing module (2) along the optical axis (14) by means of a manual drive, a gear wheel (15) fixed to the microscope body (1), or else a set of gears, engage in a corresponding section (16) of the movable focusing module (2). By means of a rotary knob (not shown) in the extension of the gear wheel shaft (1 7), the operator can displace the movable focusing module (2) along the optical axis (14) in a defined manner within a given region. A main objective (4) is arranged in the movable focusing module, in the extension of the stereoscopic observation beam path. The main objective (4) consisting of two cemented-together individual lenses is used for both stereo observation beam paths. In principle, however, the operation microscope can also be constructed with other main objectives of complex design, or even with separate main objectives for the two stereo observation beam paths (Greenough type). Moreover, various elements of the illuminating device are arranged in the movable focusing module (2). Light is coupled in from an externally arranged light source (22) via a fiber optic light guide (18); the light source, can of course, also be arranged in the movable focusing module (2). At the exit surface of the fiber optic light guide (18) are two imaging optical systems (19, 20). A deflecting element (21) in the form of a deflecting mirror follows the optical systems (19, 20). The individual elements of the illuminating device, in particular, the imaging optical systems (19, 20) and the deflecting element (21) are positioned and dimensioned such that the illuminating beam path is incident on the main objective (4) in a parallel beam path. Alternatively, positioning and dimensioning of these elements can take place such that the illuminating beam path is convergently or divergently incident on the main objective.

The same imaging or focusing properties are achieved by means of the arrangement according to the invention for both the illuminating and observation beam paths, since the distance between the deflecting element (21) and the main objective (4) is constant in every state of focusing. The elements of the illuminating device are consequently arranged, in an advantageous manner, in a fixed position relative to the main objective (4) in the movable focusing module (2). A mechanical interface (23) is shown in a schematic manner, beneath the focusing module (2). Various accessories can be attached to this interface. Included in these accessories are, for example, micromanipulators for guiding laser beams or double objectives, etc. Additional mechanical interfaces are on the microscope body (1) according to FIG. 1. Various co-observer devices 50 or documentation devices, such as cameras and the like, can be arranged on these interfaces, without having to take into account lateral space limitations due to a focusing box. In the use of co-observer devices, several observation beam paths pass through a main objective. The microscope body (1) has an additional mechanical interface (24), at which the operation microscope can be rotatably attached to a stand, only a part of a stand (25) being recognizable in FIG. 1. It is advantageous to select the interface on the microscope body (1) such that the axis of rotation runs through the center of gravity of the whole operation microscope, so that pivoting the operation microscope about this axis is possible without large torques.

Focusing within a given region of displacement takes place by the travel of the movable focusing module (2), including the main objective (4), along the optical axis (14). Various embodiments will be explained with reference to FIGS. 2a and 2b for executing the focusing motion or for operation by the operator.

Figure 2A:
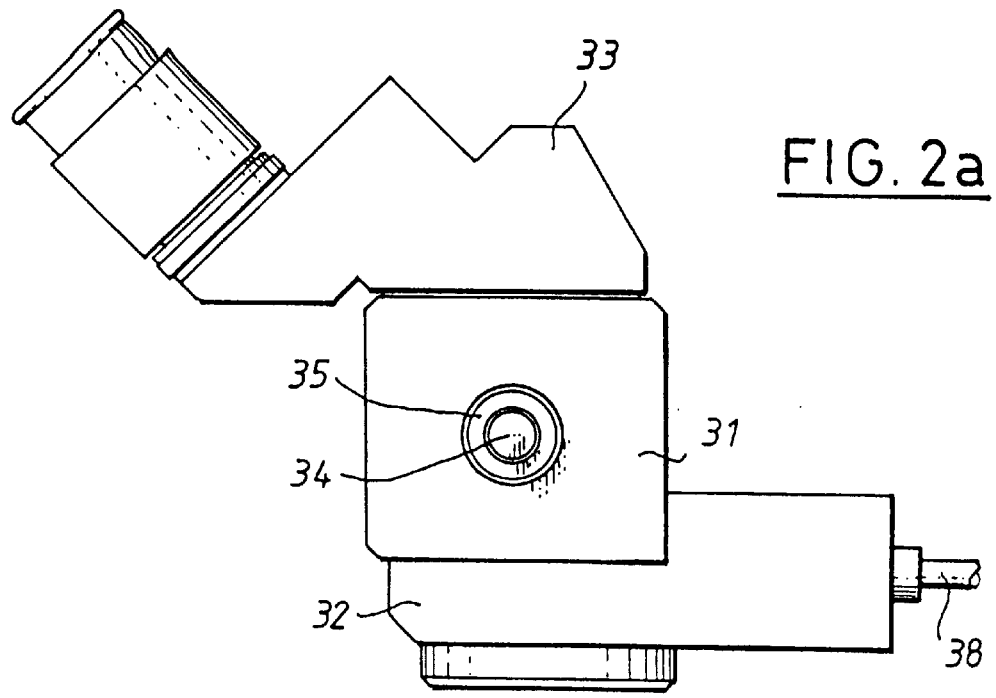
FIG. 2a shows a schematic side view of a second preferred embodiment of the operation microscope according to the invention, with a manual drive for focusing.

A second preferred embodiment of the operation microscope according to the invention is shown schematically in side view in FIG. 2a. As in FIG. 1, it essentially comprises three basic components: the binocular observation tube (33), the microscope body (31), and the movable focusing module (32). Light from an external light source is coupled into the movable focusing module (32) via a fiber optic light guide (38). Focusing of the operation microscope, i.e., the travel of the focusing module (32) along the optical axis, takes place by means of a manual drive. The focusing module (32) is movable relative to the microscope body (31) for this purpose along linear guides (not shown). A rotary knob (34) is the adjusting element for the operator. Rotary knob (34) is arranged coaxially with another rotary knob (35) that is used for setting the magnification state of the magnification-changing device in a defined manner. Alternatively, of course, it is possible to arrange such an adjusting element for focusing the operation microscope at another place on the microscope body (31). Advantageously, the resistance to rotation of the rotary knob (34) for adjusting the focusing module can be set by the operator before use and thereby matched to individual conditions. The resistance to rotation of the other rotary knob (35) for selecting the desired magnification can likewise be adjusted. In this case, a balancing of the resistance to rotation of the two rotary knobs (34, 35) is advantageous. These can be very different, or relatively similar, according to the operators preference.

Figure 2B:
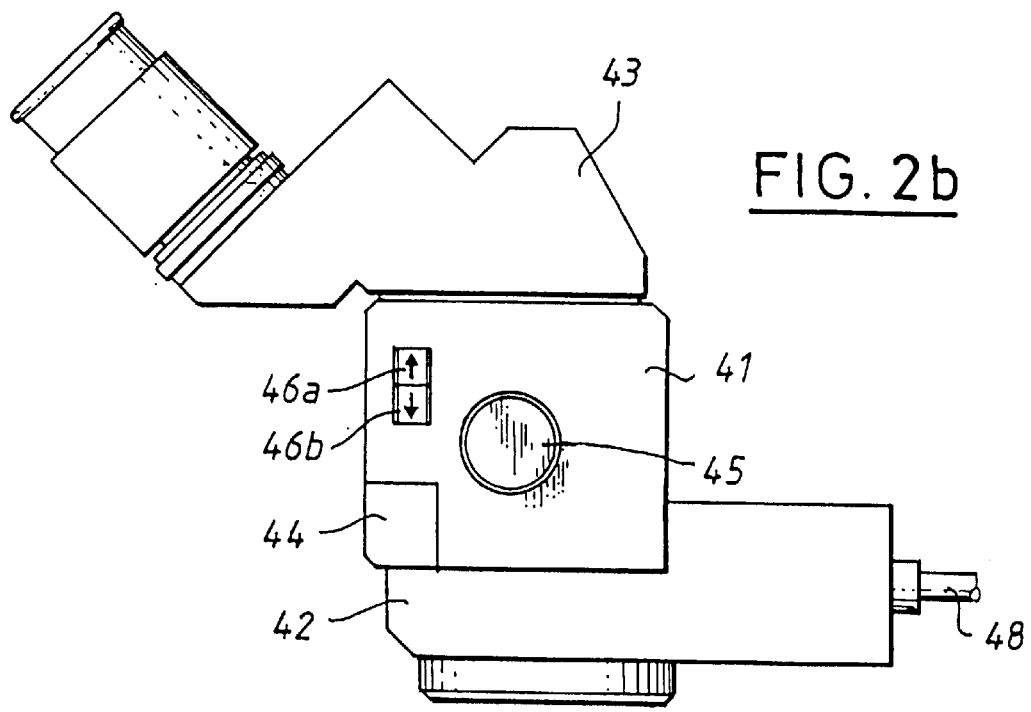
FIG. 2b shows a schematic side view of a third preferred embodiment of the operation microscope according to the invention, with a motorized drive for focusing.

Besides manual focusing of the operation microscope shown in FIG. 2a, it is also possible to focus according to the invention, by means of a motor drive, as shown in FIG. 2b. The operation microscope again consists of three basic components: a binocular observation tube (43), a microscope body (41), and a movable focusing module (42). Light from an external light source is again coupled via a fiber optic light guide (48) into the focusing module (42) having a main objective and parts of the illuminating device. The magnification-changing device in the microscope body (41) can be operated by means of a rotary knob (45). The focusing module (42) is movable relative to the microscope body (41) along linear guides (not shown). In this embodiment, the motion occurs by means of a motor drive (44), which is arranged on the microscope body (41). In a further form of embodiment, the motor drive can also be arranged in the focusing module. Operation of the motor drive (44) in the embodiment shown takes place by means of two adjusting elements arranged on the microscope body (41) in the form of touch contacts (46a, 46b). By means of touch contacts (46a, 46b) the focusing module (42) can be made to travel along the optical axis within a given adjustment region in a manner defined by the operator. With motor focusing of the operation microscope according to the invention, a less expensive drive can be used in comparison with the drive required to focus by displacing the complete operation microscope. This is because only the relatively light focusing module (42) has to be moved. Instead of focusing by means of one or more touch contacts (46a, 46b) arranged directly on the microscope body (41), the operator can carry out the defined displacement of the focusing module (42) along the optical axis by means of a foot control panel. A focusing of this kind is likewise possible under voice control.

A further preferred embodiment of the operation microscope according to the invention, arranged on a particularly suitable adjustable stand, will be described hereinbelow with reference to FIG. 3. The operation microscope again consists of three basic components, i.e., a binocular tube (53), a microscope body (51), and a movable focusing module (52). Focusing takes place by means of a manual drive, as in the embodiment according to FIG. 2a. The manual drive is again operated by the operator via a rotary knob (58), which is arranged coaxially of a further rotary knob (59), with which the respective magnification of the magnification-changing device can be set. The resistances to rotation of the two rotary knobs (58, 59) can be set by the operator.

The illustrated embodiment has a mechanical-optical interface (65), at which, for example, co-observer devices or documentation devices can be attached by means of a flange.

The operation microscope is arranged on an adjustable stand (of which only a portion (60) is visible in FIG. 3) by means of an intermediate component (61). The stand can be designed as a floor or ceiling stand. The operation microscope is movably connected to a support (62) of the intermediate component (61) via a mechanical interface (not shown in FIG. 3). The operation microscope is pivotable about a first axis (63) by means of the intermediate component (61), and can be tilted about a second axis (64). The support (62) connects the two axes (63, 64), which are oriented at right angles to each other. An energy accumulator (67) is connected to the first axis (63) and makes possible a defined setting of a desired adjustment torque about the pivot axis (63). Particulars of the energy accumulator (67) used are shown in detail in unpublished German patent application 4231516.6 of the Carl Zeiss Company of Germany. The pivoting adjustment torque is advantageously matched to the resistance to rotation that is required for manual focusing of the operation microscope by means of the rotary knob (58). Coarse focusing by the operator takes place in this arrangement by the smoothly moving spatial positioning of the whole operation microscope by means of the stand or the intermediate component (61). Fine focusing by the operator, in the range of a few centimeters, takes place by causing the movable focusing module (52) to travel along the optical axis. Such an arrangement of the operation microscope according to the invention on an adjustable stand with an energy accumulator (67) is, for example, advantageous for use in the ear, nose and throat region.

I claim:

1. An operation microscope comprising:
    a microscope body,
    at least one whole main objective having an optical axis,
    an illuminating device for illuminating an object such that said object can be observed through said whole main objective, said illuminating device including a plurality of optical elements, and
    a separate focusing module having a first portion parallel to said optical axis, and a second portion positioned at an angle to said optical axis,
    wherein said focusing module is movable linearly along said optical axis in a defined manner relative to said microscope body, said first portion of said focusing module includes said whole main objective and said second portion of said focusing module includes at least one of said plurality of optical elements of said illuminating device.

2. An operation microscope according to claim 1, wherein said main objective has an optical axis and said focusing module is movable in a defined manner along said optical axis.

3. An operation microscope according to claim 1, wherein said illuminating device projects an illuminating beam along an illuminating beam path, and said illuminating device comprises at least one imaging optical system and at least one deflecting element arranged in said focusing module such that said illuminating beam path passes through said main objective following deflection by said deflecting element.

4. An operation microscope according to claim 3, wherein said at least one imaging optical system and said at least one deflecting element are arranged in said focusing module in fixed geometric relationship to said main objective.

5. An operation microscope according to claim 1, further comprising at least two stereoscopic observation beam paths, wherein said at least one main objective is common to said two stereoscopic observation beam paths.

6. An operation microscope according to claim 1, further comprising a magnification-changing device arranged in said microscope body for selectively setting a state of magnification of said operation microscope.

7. An operation microscope according to claim 1, wherein said main objective has an optical axis, further comprising at least one linear guide arranged parallel to said optical axis for smoothly moving said focusing module.

8. An operation microscope according to claim 1, wherein said main objective has an optical axis, further comprising a motor drive for moving said focusing module along said optical axis in a defined manner within a predetermined range of adjustment.

9. An operation microscope according to claim 8, wherein said motor drive is arranged in said microscope body.

10. An operation microscope according to claim 8, further comprising at least one touch contact operably connected to said motor drive for actuation of said focusing module.

11. An operation microscope according to claim 1, further comprising at least one interface device arranged on said operation microscope to receive accessory parts.

12. An operation microscope according to claim 1, wherein said illuminating device comprises a light source arranged outside said focusing module and a fiber optic guide for coupling said light source to said focusing module and said optical element(s) included with said focusing module.

13. An operation microscope according to claim 1, further comprising a mechanical interface device connected to said microscope body, said mechanical interface device being arranged for attachment to a stand and having an energy accumulator for smooth-running manipulation of said operation microscope about at least one of a plurality of spatial axes.

14. An operation microscope comprising:
a microscope body,
at least one whole main objective having an optical axis,
an illuminating device for illuminating an object such that said object can be observed through said whole main objective, said illuminating device including a plurality of optical elements, and
a separate focusing module having a first portion parallel to said optical axis, and a second portion positioned at an angle to said optical axis,
wherein said focusing module is movable linearly along said optical axis in a defined manner relative to said microscope body, said first portion of said focusing module includes said whole main objective and said second portion of said focusing module includes at least one of said plurality of optical elements of said illuminating device, wherein said whole main objective has an optical axis, further comprising at least one linear guide arranged parallel to said optical axis for smoothly moving said focusing module.

15. An operation microscope according to claim 14, further comprising a manual drive for moving said focusing module along said optical axis in a defined manner within a predetermined range of adjustment.

16. An operation microscope comprising:
a microscope body,
at least one whole main objective having an optical axis,
an illuminating device for illuminating an object such that said object can be observed through said whole main objective, said illuminating device including a plurality of optical elements, and
a separate focusing module having a first portion parallel to said optical axis, and a second portion positioned at an angle to said optical axis,
wherein said focusing module is movable linearly along said optical axis in a defined manner relative to said microscope body, said first portion of said focusing module includes said whole main objective and said second portion of said focusing module includes at least one of said plurality of optical elements of said illuminating device, and at least one interface device arranged on said operation microscope to receive at least one accessory part.

17. An operation microscope according to claim 16, wherein said interface device comprises at least one mechanical-optical interface and said accessory part comprises at least one co-observer device.

18. An operation microscope according to claim 16, wherein said interface device comprises at least one mechanical-optical interface and said accessory part comprises at least one documentation device.

19. An operation microscope comprising:
a microscope body,
at least one whole main objective having an optical axis,
an illuminating device for illuminating an object such that said object can be observed through said whole main objective, said illuminating device including a plurality of optical elements, and
a separate focusing module having a first portion parallel to said optical axis, and a second portion positioned at an angle to said optical axis,
wherein said focusing module is movable linearly along said optical axis in a defined manner relative to said microscope body, said first portion of said focusing module includes said whole main objective and said second portion of said focusing module includes at least one of said plurality of optical elements of said illuminating device, and
a mechanical interface device connected to said microscope body, said mechanical interface device being arranged for attachment to a stand and having an energy accumulator for smooth-running manipulation of said operation microscope about at least one of a plurality of spatial axes.

20. An operation microscope according to claim 19, wherein said energy accumulator is arranged for smooth-running multidimensional manipulation of said operation microscope about a plurality of spatial axes.

21. An operation microscope comprising:
a microscope body,
at least one main objective having an optical axis,
an illuminating device including a plurality of optical elements, a first rotatable means supported by said microscope body for manually adjusting said focusing module,
settable resistance means for applying a resistance to rotation of said rotatable means which resistance can be set in a defined manner, and
a separate focusing module having a first portion parallel to said optical axis, and a second portion positioned at an angle to said optical axis,
wherein said focusing module is movable linearly ad along said optical axis in a defined manner relative to said microscope body, said first portion of said focusing module includes said main objective and said second portion of said focusing module includes at least one of said plurality of optical elements of said illuminating device.

22. An operation microscope comprising:
a microscope body,
at least one main objective having an optical axis,
an illuminating device including a plurality of optical elements,
a separate focusing module having a first portion parallel to said optical axis, and a second portion positioned at an angle to said optical axis,
wherein said focusing module is movable linearly along said optical axis in a defined manner relative to said microscope body, said first portion of said focusing module includes said main objective and said second portion of said focusing module includes at least one of said plurality of optical elements of said illuminating device, a first rotatable means supported by said microscope body for manually adjusting said focusing module, a magnification-changing device, and a second rotatable means operably connected to said magnification-changing device, said second rotatable means being arranged coaxial with said first rotatable means for setting a state of magnification of said operation microscope in a defined manner by means of said magnification-changing device.

* * * * *